Patented July 11, 1944

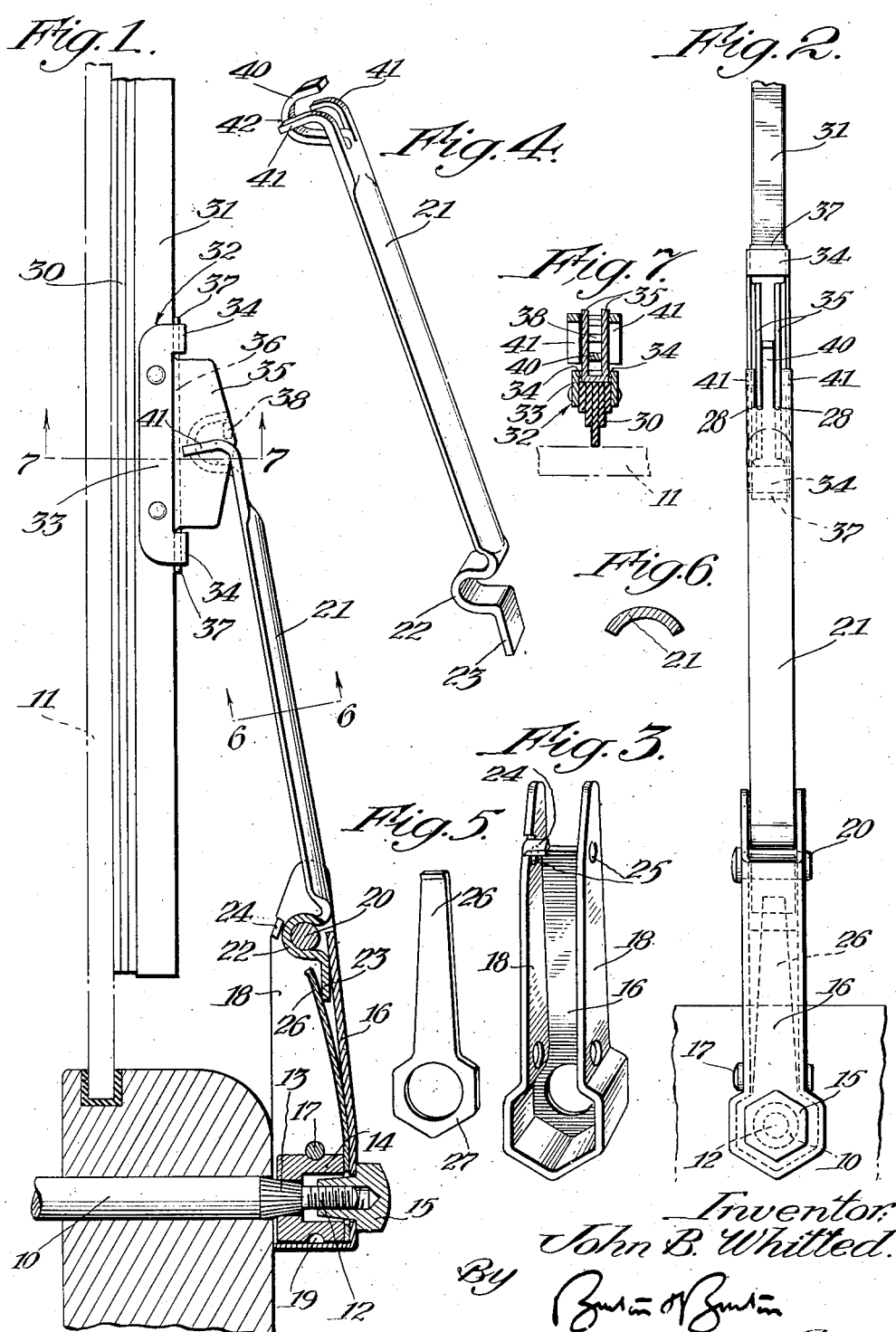

2,353,208

UNITED STATES PATENT OFFICE 2,353,208

WINDSHIELD WIPER

John B. Whitted, Evanston, Ill., assignor to Stewart-Warner Corporation, Chicago, Ill., a corporation of Virginia Application July 4, 1942, Serial No. 449,753

8 Claims. (Cl. 15—250)

This invention relates to windshield wipers and particularly to the construction of an actuating arm therefor.

One object of the invention is to provide a new and improved actuating arm for a windshield wiper.

Another object of the invention is to provide an actuating arm adapted to be made of sheet metal by relatively simple manufacturing processes and with an economy of material.

A further object of the invention is to provide an improved actuating arm for a windshield wiper formed for ready application or removal of the wiper blade from the arm and with compact means for maintaining the blade in operative contact with a windshield over which it is to operate.

Other objects and advantages of the invention will appear from the following description, taken in connection with the drawing, in which:

Fig. 1 is a side elevation of a windshield wiper with certain parts shown in section to clarify the construction and including an actuating arm embodying this invention.

Fig. 2 is a front elevation of the parts shown in Fig. 1.

Fig. 3 is a perspective view of the driving member of a two-part actuating arm.

Fig. 4 is a perspective view of the hinged wiper-carrying member of the arm.

Fig. 5 is a perspective view of the pressure spring.

Fig. 6 is a detail section taken as indicated at line 6—6 on Fig. 1.

Fig. 7 is a detail section taken as indicated at 7—7 on Fig. 1.

The type of windshield wiper to which this invention relates includes a rock shaft 10 mounted for oscillation by means of a suitable motor (not shown) and connected with a wiper blade or squeegee by means of an actuating arm which draws the blade back and forth across the surface of the windshield indicated at 11 in broken lines. The end of the shaft 10 is shown as reduced and threaded at 12, with an intermediate, tapered and knurled portion 13 onto which there is fitted a bushing 14 which is retained in position by a nut 15 engaging the threaded part 12. The bushing 14 is pocketed in the polygonally formed end of a driving arm 16, the remainder of said arm being of channeled form, as shown in Fig. 3, with a rivet 17 extending between the side flanges 18, 18 of the channeled form and engaging a groove 19 in the bushing 14 to secure it in the pocket at the end of the arm 16. At the opposite end, the driving arm 16 carries a pivot 20 by which the lever member 21 of the actuating arm is hingedly connected to the driving member 16, as seen in Figs. 1 and 2.

The lever member 21 is made of sheet metal and is so designed that it may be formed of strip stock instead of requiring an additional blanking operation for cutting it from a sheet of metal. A considerable portion of the length of the lever 21 is pressed to give it an arcuate cross section, as seen in Fig. 6, but the terminal portions are not altered in cross section. The end which adjoins the driving arm 16 includes a U-shaped bend 22 and a straight terminal 23, the latter being approximately in longitudinal alignment with the middle portion of arcuate cross-section. The U-shaped bend at 22 is dimensioned to fit over the pivot 20 to complete the hinge at the pivot axis, and one of the flanges 18 of the arm 16 includes a lug 24 extending in spaced relation to the pivot 20 and with clearance between said pivot and the lug to accommodate the thickness of the U-shaped portion 22 of the hinged lever 21. It may be understood that in assembling the actuating arm, the U-shaped part 22 of the lever member 21 will be placed between the flanges 18, 18 of the driving arm 16 adjacent the lug 24, and the pivot 20 will then be inserted through the previously formed holes 25 in the flanges 18 and riveted in this position.

The terminal 23 of the lever 21 is disposed under the free end of the overlapping flat spring member 26 having a polygonally formed eye 27 at one end which fits into the pocket of the arm 16 in which the bushing 14 is secured; and the eye 27 of the spring 26 is held between one face of the bushing 14 and the opposing wall of the arm 16, being firmly secured by the clamping effect of the nut 15 when the bushing is applied to the end of the shaft 10.

At the opposite end the lever 21 is split into three parts by two parallel slots 28, 28 for engagement with a fitting which is a part of the wiper blade or squeegee assembly. This assembly includes the rubber contact member 30 which is gripped between the side walls of the metallic channel member 31, the channel member having rigidly secured to it a saddle 32 comprising spaced, parallel flanges 33 which embrace the channel 31 and which are transversely connected by bridge members 34 at the ends of the saddle. A coupling member to which the lever 21 is directly connected includes a pair of spaced ears 35 bent at right angles to a web 36, the web being longer than the ears and having its end portions 37 engaged between the back of the channel 31 and the bridge portions 34 of the saddle 32. A small cross bar 38 extends transversely between the ears 35.

The slots 28 in the end of the lever 21 divide this terminal portion into a central hook member 40 and a pair of driving arms 41 which are bent approximately at right angles to the main portion of the lever 21, so that, when the hook 40 is fitted between the ears 35 on the wiper blade assembly, the arms 41 embrace the outer faces of the ears 35 providing a driving connection for swinging the blade back and forth over the surface of the windshield 11. The central hook 40 may be dimensioned to fit rather snugly between ears 35 so as to supplement the arms 41 for transmitting the driving force. The convexly rounded surface of the hook 40 at 42 bears against the web 36 of the coupling member in a direction to urge the wiper blade against the surface of the windshield 11. This pressure originates with the spring 26 bearing against the short terminal 23 of the lever 21 and tending to rock the lever about the pivot 20. The spring 26 thus maintains firm contact of the wiper blade with the windshield surface throughout its oscillating motion, and said motion is efficiently transmitted from the arm 16 to the lever 21 by reason of the fact that the pivot 20 is of substantial length and that the end portion of the lever carried by this pivot is snugly held between the side flanges 18 of the driving arm 16. The hook 40 is readily disengaged from the coupling member by simply swinging the lever 21 about the lug 38 through a limited angle and then withdrawing the end of the hook from under the lug and from between the ears 35 of the coupling member. Ordinarily this is accomplished after removing the nut 15 and disengaging the entire actuating arm from the end of the shaft 19. In wiping the windshield or cleaning the working edge of the rubber blade 30, the squeegee can be separated from the windshield surface by swinging the lever 21 through a limited angle about its pivot 20 in opposition to the pressure of the spring 26.

I claim as my invention:

1. In a windshield wiper, an actuating arm of two members pivotally connected, one member being formed from a flat strip with a portion at one end operatively engaged with a wiper blade and with a portion at the other end formed with a U-shaped bend curved to fit partially around a pivot carried by the other member, together with spring means pressing said U-shaped part into engagement with such pivot and also tending to swing said one member about the pivot in a direction to press its opposite end forcibly against the wiper blade.

2. In a windshield wiper, an actuating arm of two members pivotally connected, one member being formed from a flat strip of uniform width with a portion of its length arched in cross section and with a portion beyond one end of the arched portion formed with a U-shaped bend curved to fit partially around a pivot carried by the other member, and with a flat terminal portion extending from said bend in approximate alignment with the portion of arched cross section, and spring means carried by said other member bearing against said flat terminal portion.

3. In a windshield wiper, an actuating arm of two members pivotally connected, one member being formed from a flat strip with a portion at one end of the strip formed with a U-shaped bend curved to fit partially around a pivot carried by the other member, and means on said other member yieldingly pressing said U-shaped portion into engagement with the pivot.

4. In a windshield wiper, an actuating arm of two members pivotally connected, one member being formed from a flat strip with a portion at one end of the strip operatively engaged with a wiper blade, a portion at the other end being formed with a U-shaped bend open toward the general plane of the strip, the other member being of channel cross section with smooth side flanges spaced to receive said U-shaped portion between them, and a pivot extending between said flanges embraced by said U-shaped portion, together with a flat spring disposed between said flanges and pressing said U-shaped portion into engagement with the pivot.

5. In a windshield wiper, an actuating arm of two members pivotally connected, one member being formed from a flat strip with a portion at one end of the strip operatively engaged with a wiper blade, a portion at the other end being formed with a U-shaped bend, the other member being of channel cross section, with side flanges spaced to receive said U-shaped portion between them, and with a pivot carried by said flanges and embraced by said U-shaped portion, one of the flanges having a lug extending parallel to the pivot and adjacent the U-shaped portion, confining it on the pivot.

6. In a windshield wiper, an actuating arm of two members pivotally connected, one member being formed from a flat strip with a portion at one end of the strip operatively engaged with a wiper blade, a portion at the other end being formed with a U-shaped bend, the other member being of channel cross section, with side flanges spaced to receive said U-shaped portion between them, and with a pivot carried by said flanges and embraced by said U-shaped portion, the said first-mentioned member having a flat terminal extending from its U-shaped portion and confined in the channel of said other member.

7. In a windshield wiper, an actuating arm of two members pivotally connected, one member being formed from a flat strip with a portion at one end of the strip operatively engaged with a wiper blade, a portion at the other end being formed with a U-shaped bend, the other member being of channel cross section, with side flanges spaced to receive said U-shaped portion between them, and with a pivot carried by said flanges and embraced by said U-shaped portion, the first-mentioned member having a flat terminal extending from its U-shaped portion and confined between the flanges of said other member, said other member including a bushing clamped against the web of the channel with a flat spring arm interposed, the remote end of said spring bearing against the flat terminal.

8. In a windshield wiper which includes a blade, an actuating arm of two members pivotally connected together, with one of said members engaged at one end with the blade, a portion at the other end of said member being formed with a U-shaped bend, the other member of the actuating arm being of channel cross section with side flanges spaced to receive said U-shaped portion between them and with a pivot carried by said flanges embraced by the U-shaped portion, the first mentioned member having a flat terminal extending from its U-shaped portion and confined between the flanges of the channeled member, the latter including a bushing clamped against the web of the channel with a flat spring arm interposed and with the remote end of said spring bearing against the flat terminal in a direction to rock said first mentioned member about the pivot and press its hooked portion against said web of the blade fitting.

JOHN B. WHITTED.